April 15, 1952 M. E. MOHR 2,593,330
VARIABLE FREQUENCY RELAXATION OSCILLATOR
Filed June 2, 1949 4 Sheets-Sheet 1

INVENTOR
M. E. MOHR
BY: Robert J. Bluskey
ATTORNEY

VARIABLE FREQUENCY RELAXATION OSCILLATOR

Filed June 2, 1949 4 Sheets-Sheet 2

INVENTOR
M. E. MOHR
BY
Robert J. Bluskey
ATTORNEY

INVENTOR
M. E. MOHR
BY: Robert J. Bluskey
ATTORNEY

INVENTOR
M. E. MOHR
BY: Robert J. Fluskey
ATTORNEY

Patented Apr. 15, 1952

2,593,330

UNITED STATES PATENT OFFICE 2,593,330

VARIABLE FREQUENCY RELAXATION OSCILLATOR

Milton E. Mohr, New Providence, N. J., assignor to Bell Telephone Laboratories, Incorporated, New York, N. Y., a corporation of New York Application June 2, 1949, Serial No. 96,706

9 Claims. (Cl. 250—36)

This invention relates to electrical systems and more particularly to oscillatory systems in which the frequency of oscillation may be changed between predetermined limits.

In the electric signaling art, it is frequently desirable to determine the frequency composition of a complex signal wave, such as a speech signal wave. In such waves the instantaneous amplitude may rapidly vary in a complex manner dependent upon the instantaneous phase relations of a plurality of different wave components, each of which represents a different sound in the original signal; or a different frequency, or narrow band of frequencies, in the electrical equivalent of the original signal. The determined frequency composition may be utilized in a number of ways, one of which is to depict graphically the varying composition of the wave in spectographic form, such that the dimensional coordinates of the graph represented frequency and time, respectively, and the degree of brightness of each coordinate point in a visual graphic representation indicates the mean intensity of a particular frequency component at a particular instant of time. A system in which a complex signal wave may be dissected and graphically displayed in the above-described manner is disclosed in United States Patent 2,403,986, dated July 16, 1946, to Lester Y. Lacy, reference to which is hereby made.

In systems of this type a complex signal wave is modulated with the output of an oscillator, the frequency of which is swept, or varied, between predetermined limits, and one of the sideband products of modulation is applied to the input of a relatively narrow band-pass filter. The frequency of the oscillators is varied such that desired sideband is repeatedly moved, or swept, across the pass-band frequency of the filter. The effect of this action is that the filter virtually repetitively traverses the sideband modulation component, and during each traverse selectively passes, or segregates, the various frequency components of the sideband.

It is an object of the present invention to improve the means for segregating the components of a complex wave by providing an improved variable frequency modulating wave.

It is also an object of this invention to improve the oscillatory characteristics of relaxation type oscillators.

In an embodiment of the invention that is to be described in detail herein, there is produced a variable frequency complex, or square wave of exceptionally high frequency, and possessing unusual stability with linearity of variation as the control parameters are varied. This wave is obtained from a unique and novel relaxation oscillator of the multivibrator type, the frequency of which may be varied between predetermined maximum and minimum values in substantially equal discrete steps. Control of the changes in the oscillator's frequency resides in a stair-step voltage wave generator which utilizes the so-called "bucket and dipper" method of charging a storage, or "sweep," capacitor, and in which the capacitor is discharged in an exceptionally short interval, thereby realizing an unusually short restoration, or fly-back time. A second control arrangement is provided for the oscillator by means of which the oscillating frequency, at one of its limiting conditions, is checked after each frequency sweep, and corrective adjustments are applied when the measured frequency differs from a predetermined value.

The nature of the invention and its various features, objects and advantages will be more fully understood from a consideration of the following description of one embodiment, illustrated in the accompanying drawing in which.

*General description*

Figure 1:
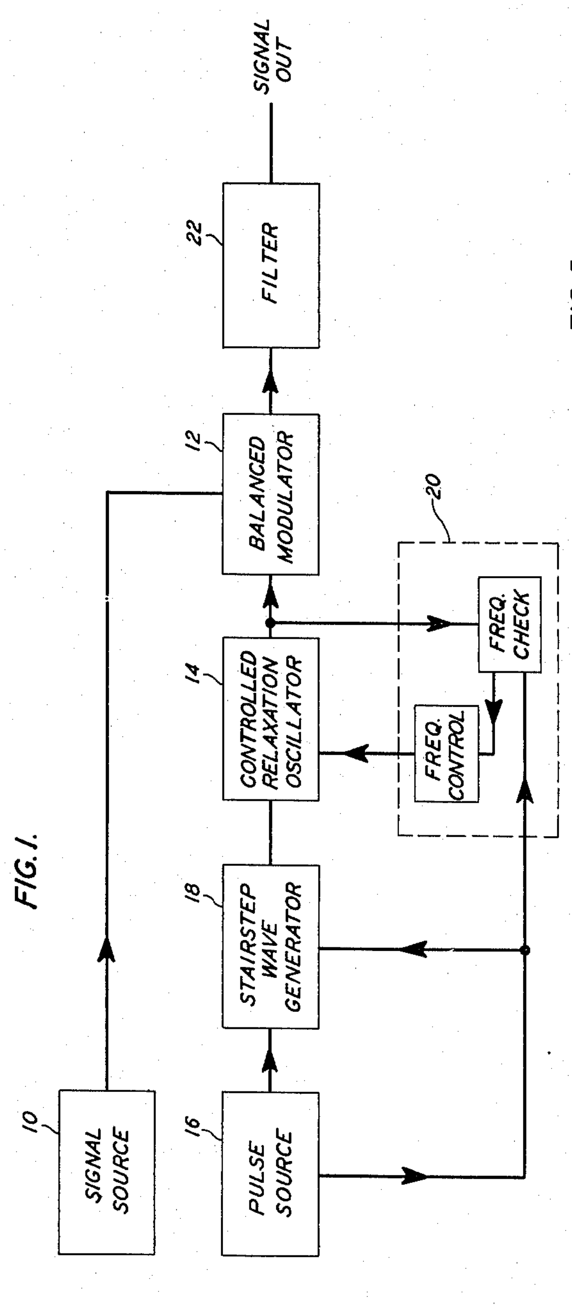
Fig. 1 illustrates diagrammatically an arrangement wherein the oscillatory system of the invention may be incorporated as a part of a wave analyzing system.

Referring now to Fig. 1, there is shown diagrammatically a portion of a wave analyzing system incorporating the invention. The arrangement of Fig. 1 comprises a source 10 of signal waves, a modulator 12, an oscillator 14, a source 16 of trains of impulses or pulses of differing durations and differing recurrence rates, a so-called stair-step or staircase-type wave generator 18, a frequency stabilizing circuit 20 including a frequency-checking branch and a frequency-controlling branch, and a band-pass filter 22. Such an arrangement might, with suitable interconnecting arrangements, be incorporated in the visible-speech portraying arrangement disclosed in the above-mentioned Lacy patent.

More particularly, complex signal waves from source 10 are supplied to a balanced modulator 12, which may be any suitable known type, along with square wave oscillations from oscillator 14, the frequency of which is controlled by generator 18. Two trains of voltage pulses are supplied by pulse source 16. A first train of these, composed of pulses of relatively short duration having any suitable recurrence rate, for example, 400 a second, is supplied to the generator 18 to cause it to produce an output wave which successively steps, or increases in substantially equal valued increments, between predetermined minimum and maximum values as such pulses are received. The pulses of the second train of pulses are of relatively long duration, and have a recurrence rate which varies as the reciprocal of the number of step increments that are to be included in the output wave of generator 18. These relatively long pulses are delivered simultaneously to the generator 18 and to the frequency checking branch of the frequency stabilizing circuit 20. The stepping operation of generator 18 is suspended during the interval of each long pulse of this second train of pulses, and the generator is reset, or reconditioned, to start the production of a new stepped wave at the end of the pulse period. Simultaneously, oscillator 14 is restored to its original operating conditions, and its output frequency is observed by the frequency-checking branch of stabilizing circuit 20. This frequency observation or determination is made by observing the voltage that is developed in a frequency-sensitive circuit by oscillations from oscillator 14, and any discrepancy from a predetermined and desired frequency is transformed into a biasing adjustment that, acting through the frequency-control branch of the stabilizing circuit 20, tends to restore oscillator 14 to its optimum unstepped, or minimum, frequency value. Modulator 12 functions in a conventional manner to produce modulation products from the combined waves. These products are applied to the input of a band-pass filter 22 suitably proportioned in known manner, the pass-band and center frequency of which are suitably correlated with the frequencies of the signal wave from source 10 and the modulating wave from oscillator 14. The output from filter 22 may be applied in any desired manner, for example, to control the intensity of a cathode-ray beam as is done in the aforementioned Lacy patent.

*Detailed description*

Figure 5:
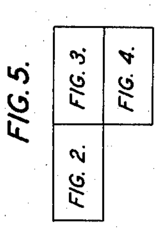
Fig. 5 indicates the manner in which Figs. 2, 3 and 4 should be arranged to show the complete schematic diagram of the described embodiment.
Figure 2:
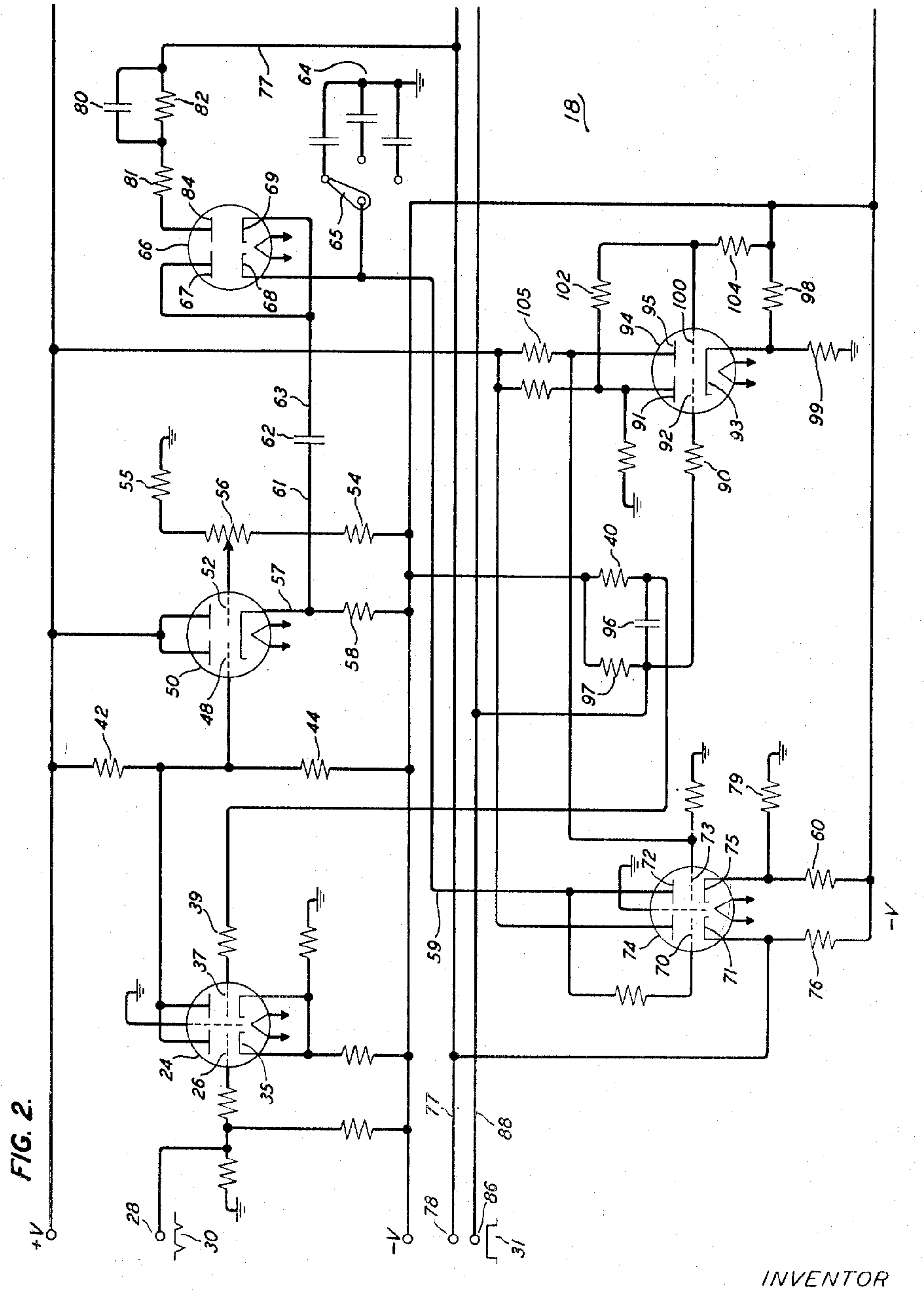
Figs. 2, 3 and 4 are schematic diagrams of the stair-step wave generator, the relaxation oscillator and the frequency stabilizing circuits, respectively, in accordance with the invention, and incorporated in the arrangement of Fig. 1.
Figure 3:
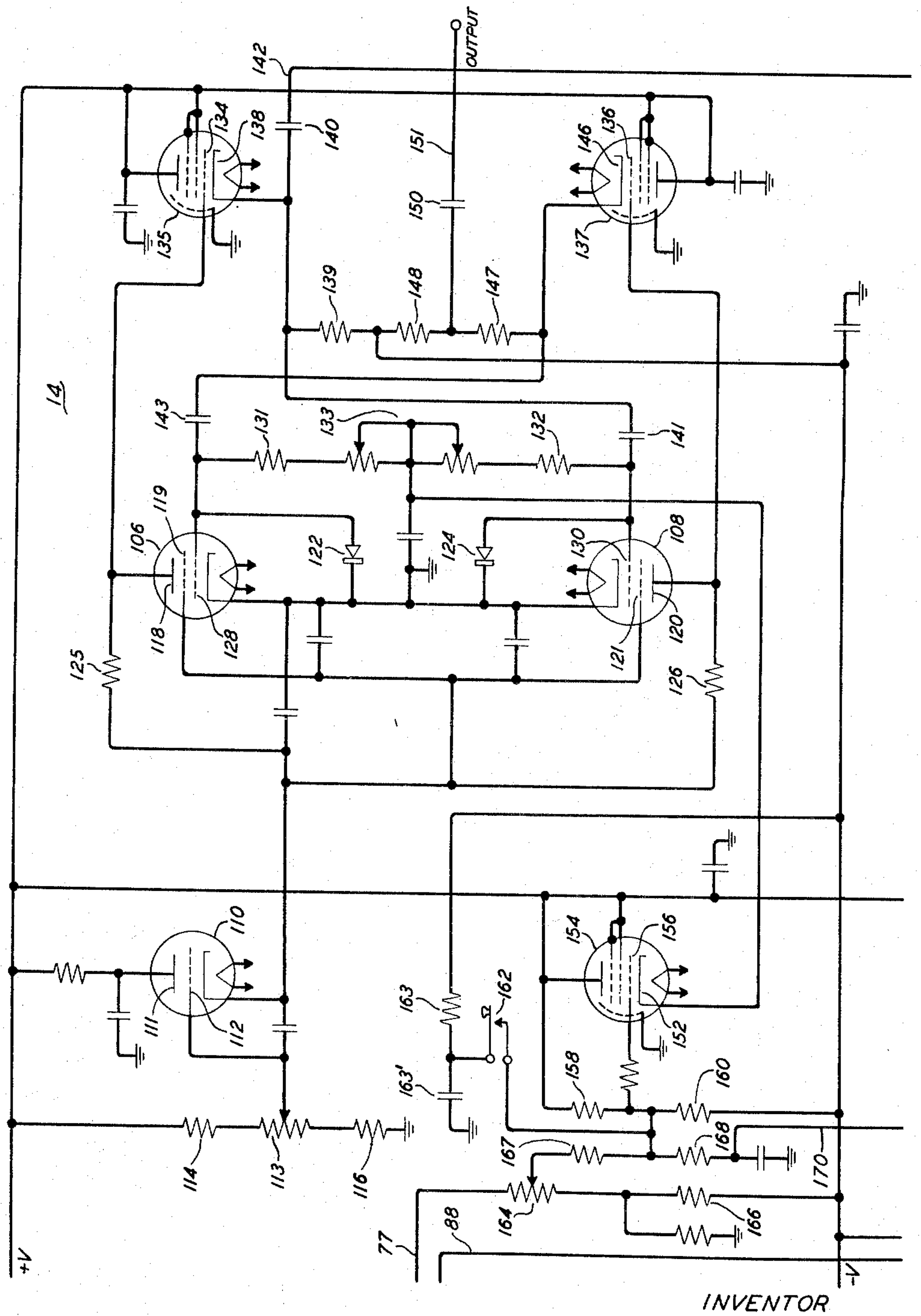
Figure 4:
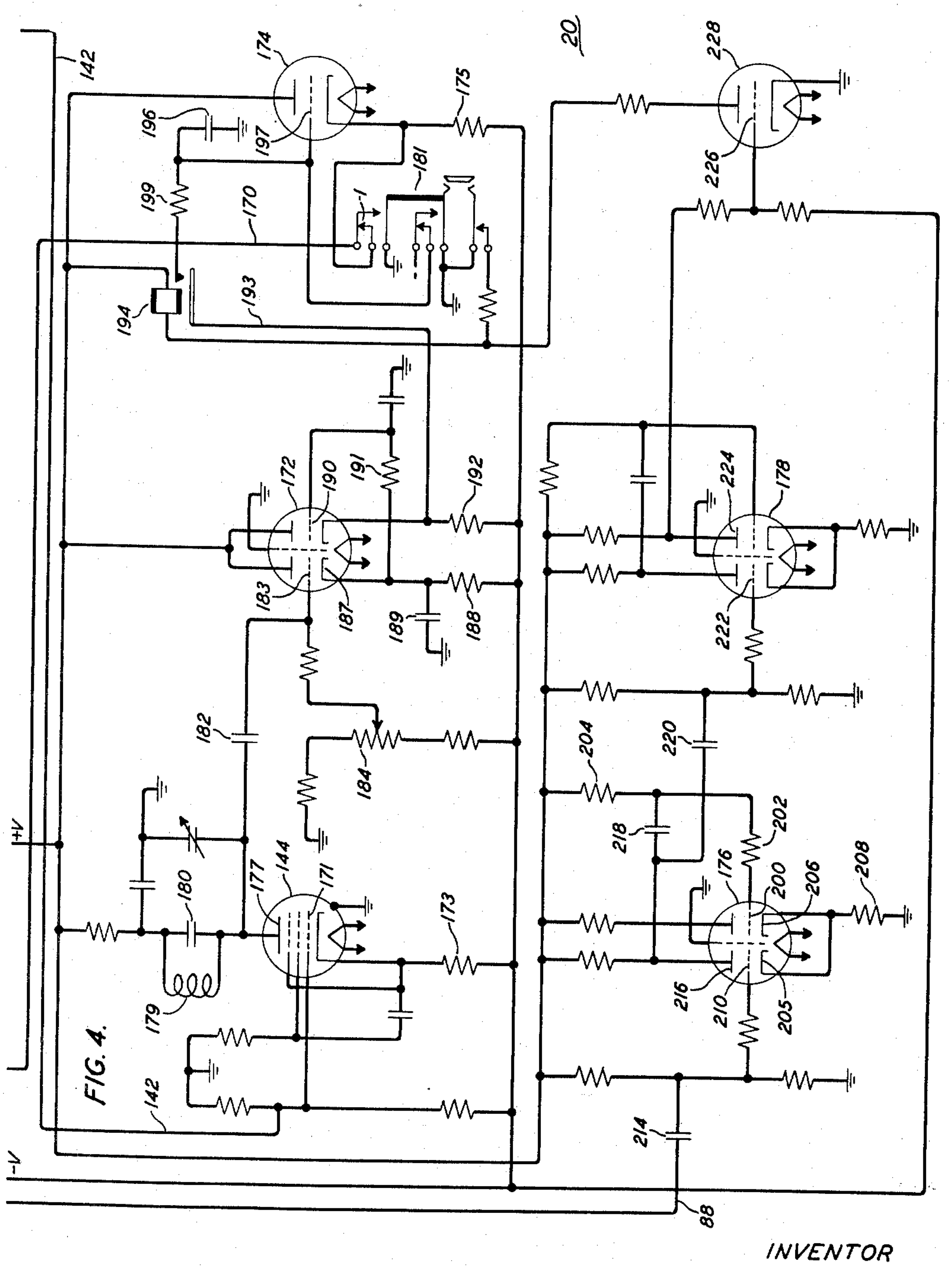

A specific structure or circuit arrangement for producing a square wave output, the frequency of which is variable in a series of discrete steps between fixed minimum and maximum values, is shown in Figs. 2, 3 and 4, when arranged in the manner shown in Fig. 5.

Referring to Fig. 2, there is shown the stair-step wave generator 18. The circuit of generator 18 comprises a plurality of multiple-section electron discharge devices, specifically, the double-triode vacuum tubes 24, 50, 74, 94 and the double-diode vacuum tube 66, and associated resistors and capacitors. The control grid electrode 26 of tube 24 is normally biased positively with respect to its cathode 35, and is connected to pulse input terminal 28 at which the short, sharp, negative voltage impulses 30 are received from pulse source 16 (Fig. 1). The left half of tube 24 acts as a polarity inversion amplifier. The right half of tube 24 is normally held at anode current cut-off by the negative potential that is derived by control grid 37 through resistors 39, 40. Control electrode 37 is also coupled by way of resistor 39, capacitor 96 and conductor 88 to pulse input terminal 86, at which the relatively long, widely spaced, positive voltage impulses 31 of the second series of pulses from source 16 (Fig. 1) are received. Resistors 42, 44 form a high-precision voltage divider, to which are connected the anodes of tube 24 and the control electrode 48 of tube 50. Thus, the potential of control electrode 48 is controlled by current conduction in either half of tube 24. Resistors 54, 55, and potentiometer 56 form a voltage divider circuit to which the control electrode 52 of tube 50 is connected. When the left half of tube 24 is in its saturated anode current condition, the potential on control electrode 52 is more positive than is the potential on control electrode 48, and the poential of cathode 57 of tube 50 is determined solely by the potential of control electrode 52. Resistor 58 is a cathode load resistor across which is generated a voltage depending upon the current conduction in tube 50. The upper end of resistor 58 is connected over conductor 61 to one terminal of the "dipper" or transfer capacitor 62. The other terminal of capacitor 62 is connected over conductor 63, through the left half of double diode 66, that is, anode 67 and cathode 68, and over switch 65 to the sweep, "bucket," or storage capacitor 64. Capacitor 64 is shown as a multisection unit of different values, any one of which may be chosen by varying the position of switch 65. The values of the sections of capacitor 64 are chosen with regard to the size of the voltage steps, or increments, that are desired in the stepped output wave from generator 18. Although an arrangement for so doing is not specifically shown in the drawing, since it does not form a part of this invention, it should be understood that the pulse recurrence rate of the previously described relatively long voltage impulses 31, of the second train of pulses obtained from pulse source 16 (Fig. 1), is variable, and that it is coordinated with the position of switch 65 such that as the period between these pulses is made greater or smaller the capacity of capacitor 64 is increased or decreased, proportionately. Thus, the proper coordination of the position of switch 65 and the repetition rate of the long pulses 31, from source 16, results in the production of an output, or sweep, voltage that varies between the same minimum and maximum values independently of the number of steps or incremental changes in it.

The upper or ungrounded terminal of capacitor 64 is connected through switch 65 and over conductor 59 to control electrode 70 and anode 72 of the double triode 74. The left half of double triode 74 forms a cathode follower, with cathode 71 connected through cathode load resistor 76 to a source of negative potential. The upper terminal of resistor 76 is connected over conductor 77 to terminal 78, where it is available for connection to any suitable utilization circuit, such as the horizontal deflection plates of a cathode-ray tube (not shown), and is also connected over conductor 77 to the bias producing combination comprising capacitor 80 and resistor 82, and through resistor 81 to anode 84 of the right half of diode 66. The cathode 69 associated with anode 84 is connected to anode 67, and over conductor 63 to capacitor 62. The bias producing means 80, 82 is provided to prevent undesired charging of capacitor 64 during the interval between pulses at terminal 28. This charging would otherwise occur since the cathode 71 is normally at a higher potential than its control electrode 70, and charging current can flow over the circuit comprising cathode 71, conductor 77, right and left halves of double diode 66, conductor 59, switch 65 and capacitor 64. The potential on capacitor 64 is reflected on control electrode 70; and, therefore, unless a blocking bias, such as is developed across the combination 80, 82, is provided, this charging action continues until the left half of double triode 74 becomes overloaded.

Pulses 31 from terminal 86 are applied over conductor 88 and through resistor 90 to control electrode 92 of the tube 94. Control electrode 92 is normally held negative with respect to its associated cathode 93 by the negative potential that it derives through resistors 97, 90. The potential of cathode 93 is normally somewhat positive with respect to that on control electrode 92 because of its connection to the voltage divider comprising resistors 98, 99. The right half of tube 94 is normally held at anode current saturation by the potential its control electrode 100 derives from the voltage divider comprising resistors 102, 104. Anode 91 is connected to electrode 100 through resistor 102. Anode 95 is connected directly to the control electrode 73 of the right half of tube 74. Anode resistor 105 is of such value that when the right half of tube 94 is at anode current saturation, control electrode 73 is held sufficiently negative with respect to the potential existing on its associated cathode 75 so as to render the right half of tube 74 non-conducting.

Referring now to Fig. 3, the relaxation oscillator 14 comprises a plurality of electron discharge devices or vacuum tubes, specifically, triode 110, tetrodes 106, 108, pentodes 135, 137, 154, unidirectionally conducting devices 122, 124, key 162, and associated resistors and capacitors. Tubes 106, 108 may be operated with a relatively low anode and screen grid voltage supply, which in one tested embodiment was about 60 volts, as obtained from voltage regulating tube 110. Anode 111 of triode 110 is connected to a suitable source of positive potential. Control electrode 112 is connected to the movable contact of a potentiometer 113, which forms a portion of the voltage divider circuit comprising resistors 114, 116. The potential at electrode 112 controls the magnitude of the voltage supplied to anodes 118, 120 and screen electrodes 119, 121 of oscillator tubes 106, 108. The cathode electrodes of these latter tubes are connected directly to ground, and a suitable unidirectional conducting device 122, 124, such as a germanium varistor, is shunted between the control electrode and the cathode of each tube. Anode load resistors 125, 126 are of relatively low value in order to minimize the effects of tube capacity, and in order to obtain desired saturation characteristics in the tubes 106, 108. In one tested embodiment of the invention, in which type 807 oscillator tubes were employed, and in which the oscillating frequency was linearly varied from about 1.22 to 2.0 megacycles per second, it was found desirable to use high-quality deposited-carbon type resistors in these anode circuits instead of the more conventional wire-wound units, in order to reduce or eliminate the effects of residual inductance. Control grid electrodes 128, 130 are connected to grid return circuits comprising resistor 131 and the upper half of potentiometer 133 and resistor 132 and the lower half of potentiometer 133, respectively The anodes 118, 120 are connected directly to control electrodes 134, 136 of cathode followers 135, 137, respectively. Cathode 138 of tube 135 includes in its circuit load resistor 139, and is also coupled through capacitor 141 to control electrode 130. This cathode is also connected to one terminal of coupling capacitor 140, the other terminal of which is connected over conductor 142 to control electrode 171 of amplifier tube 144 (Fig. 4). Returning to Fig. 3, cathode 146 of tube 137 includes in its circuit load resistors 147 and 148, and is also coupled through capacitor 143 to control electrode 128 of tube 106. One terminal of output coupling capacitor 150 is connected to the cathode end of resistor 148. The other terminal of this capacitor may be connected over conductor 151 to a suitable utilization circuit, such as the balanced modulator 12 of Fig. 1. The mid-point of potentiometer 133 in the control grid circuits of tubes 106, 108 is connected directly to the cathode electrode 152 of cathode follower tube 154. The control electrode 156 of this tube is connected through a decoupling resistor to a suitable potential point on the voltage divider comprising resistors 158, 160, proportioned such that, together with the other voltages that are derived through resistors 167, 168 relaxation oscillator 14 will be biased to a suitable minimum frequency operating value. The common junction point of resistors 158, 160 is also connected to starting key 162, to one contact of which negative potential is connected through resistor 163. Also connected to this common junction point is a voltage dividing resistance network comprising potentiometer 164, resistor 166, and the resistors 167 and 168. The upper terminal of potentiometer 164 is connected over conductor 77 to the cathode 71 of tube 74 (Fig. 2), from which a voltage that is representative of the charge on capacitor 64 is obtained. The lower terminal of resistor 168 is connected over conductor 170 and contact 1 of key 181 to the cathode end of load resistor 175 in the frequency control branch of the frequency stabilizing circuit 20 (Figure 4). The function of the resistance network comprising resistors 158, 160, 166, 167, 168, and potentiometer 164 is to provide a suitable unidirectional potential operating point for the relaxation oscillator, to properly proportion on control electrode 156 the stepped voltage as it is derived from conductor 77, and to provide means for injecting over conductor 170 a frequency controlling voltage derived from the frequency stabilizing circuit 20.

The frequency stabilizing circuit 20, shown in Fig. 4, comprises a voltage feedback circuit including electron discharge devices, specifically, vacuum tubes 144, 172 and 174, and a delay circuit comprising a pair of single-trip multivibrator circuits including electron discharge devices, specifically, vacuum tubes 176, 178. The control electrode 171 of vacuum tube 144 is connected over conductor 142 and coupling capacitor 140 to cathode 138 of cathode follower 134 (Fig. 3). Vacuum tube 144 forms part of a pentode amplifier, the cathode of which is connected to negative potential through resistor 173. Anode 177 of tube 144 is connected to a tuned circuit comprising inductor 179 and capacitor 180, the values of which are chosen such that the combination resonates at a frequency that is slightly less than the minimum operating frequency of oscillator 14. The operation Q, or quality, of this combination is suitably about 40, and thus the voltage appearing on anode 177 is a reasonably good sine wave, notwithstanding that the excitation voltage on control electrode 171 is a highly distorted wave of the square type. Anode 177 is coupled through capacitor 182 to control electrode 183 of the left half of tube 172, the operating bias of which is derived over the movable contact of potentiometer 184, and which may be chosen such that cathode 187 of tube 172 is at a suitable positive potential with respect to ground when relaxation oscillator 14 is operating at its minimum frequency value. In one tested embodiment of the invention in which the minimum frequency value of oscillator 14 was 1.22 megacycles per second, this cathode potential was suitably between 10 and 20 volts. Resistor 188 and capacitor 189 comprise a filter having a time constant that is relatively long with respect to the oscillations of oscillator 14, for example, 100 microseconds. Therefore, when control electrode 183 is excited by a voltage wave from oscillator 14, the potential of cathode 187 increases to a voltage that corresponds very nearly to the peak value of the voltage appearing on this control electrode. The right half of tube 172, including control electrode 190, operates as a cathode follower to repeat across cathode load resistor 192 substantially the same potential that exists at cathode 187. The upper terminal of cathode resistor 192 is connected over conductor 193, the contacts of relay 194, when operated, and through resistor 199 to the storage capacitor 196 and also to the control electrode 197 of cathode follower tube 174. Resistor 199 and capacitor 196 are chosen of such values that their time constant is of sufficient length to eliminate any tendency toward hunting about the optimum minimum frequency by oscillator 14. The cathode of tube 174 is connected through contact 1 of key 181 and conductor 170 to the lower terminal of resistor 168, in the control electrode circuit of tube 154 (Fig. 3). Key 181 provides, in the manner indicated, a ready means of initially adjusting the control potentials for suitable operation of oscillator 14 and frequency stabilizing circuit 20. The delay circuit comprising double triode 176 is connected as a single-trip multivibrator, in which the control electrode 200 of the right half of tube 176 is connected to anode potential through resistors 202, 204. Cathodes 205, 206 are connected to the upper terminal of cathode resistor 208. In the absence of any signal on control electrode 210, of the left half of tube 176 that half of the multivibrator oscillator is non-conducting. Terminal 86 (Fig. 1) is connected over conductor 88 and through coupling capacitor 214 to control electrode 210. The anode 216 of the left half of tube 176 is coupled through capacitor 218 to control electrode 200, and is also coupled through coupling capacitor 220 to control electrode 222 of a second delay circuit consisting of the single-trip multivibrator comprising the double triode 178. This second multivibrator may be similar in all respects to the previously described unit including double triode 176, except that the equivalent of resistor 202 is not included in its control grid circuit. This resistor is included in the circuit of control electrode 200 in order to sharpen the voltage impulses that control electrode 222 derives from anode 216. It is not needed in the circuit of the second multivibrator. Anode 224 of the right half of tube 178 is coupled directly to control electrode 226 of triode 228, the anode circuit of which includes the winding of relay 194.

*Operation*

The manner in which the circuit of Figs. 2, 3 and 4 operates may be best appreciated from the following description if the functional objectives of the various circuit portions are first recalled. The step-wave generator 18 (Fig. 2) utilizes the so-called dipper and bucket method of charging storage capacitor 64 to produce across the capacitor a potential which changes, in any desired number of substantially equal increments, between predetermined minimum and maximum values. This range of changing potential values is produced once during each predetermined interval, the duration of which is coordinated with the period between the pulses 31 of the second series of pulses. At the end of each potential sweep, or cycle of increment changes, it is a function of this generator circuit to discharge the storage capacitor to the same minimum potential value, and to perform this discharge function in the shortest possible time.

The relaxation oscillator 14 (Fig. 3) operates to change linearly its oscillation frequency between predetermined minimum and maximum values in accordance with the changes of potential across the storage capacitor, or bucket, of the step-wave generator 18. Oscillator 14 varies its frequency from the same minimum value to the same maximum value, regardless of the number of steps or potential increments that occur during the sweep interval. It may also be noted that the instantaneous frequency of oscillator 14 is a fixed and stable value during the period of any potential value of the output wave produced by generator 18. The output of this oscillator is suitable for combination with a second train of complex waves, such as speech signals, in a utilization circuit, such as a balanced modulator 12 (Fig. 1).

It is the function of the frequency stabilization circuit 20 (Fig. 4) to constantly monitor the output of oscillator 14, and to derive during each of its periods of minimum frequency a voltage indication of that frequency. This voltage indication is supplied to the input of the oscillator 14 in a manner that tends to control the oscillator at the predetermined optimum value during the next succeeding sweep interval. Because the frequency of oscillator 14 is a varying quantity, it is necessary that the frequency stabilizing circuit 20 perform its functions within the comparatively short interval during which oscillator 14 is operated at its minimum value. To this end, a timing circuit is included for interconnecting the frequency checking and frequency control branches of the stabilizing circuit for a relatively short interval during each sweep cycle of the oscillator.

Returning now to Fig. 2, the pulse inverting left half of tube 24 is normally conducting, and its right half is non-conducting because of the high negative potential that is derived by its control electrode 37 through resistors 39, 40. When no negative pulse 30 exists at terminal 28, the potential on control electrode 48 is lower than that on electrode 52, and the potential of cathode 57 of tube 50 is determined by the potential that electrode 52 derives from potentiometer 56. This value fixes the minimum value of the voltage across resistor 58. When a negative voltage impulse 30 is received at terminal 28, it is inverted in the anode circuit of the left half of tube 24, and momentarily increases the potential of electrode 48 to a value determined by the voltage divider 42, 44 such that it exceeds the steady biasing potential on electrode 52. Therefore, the potential of cathode 57 varies between a predetermined minimum value, as determined by the potential derived from potentiometer 56, and a predetermined maximum value as determined by the potential derived from the voltage divider 42, 44. When cathode 57 changes to its maximum potential value, the potential across capacitor 62 is changed by an amount corresponding to the difference between these values, which change causes charge to flow through capacitor 62, through the left side of double diode 66 comprising anode 67 and cathode 68, and into the sweep capacitor 64, connected between cathode 68 and ground. The amount of this charge, or the voltage division across the two capacitors 62, 64 will be proportional to the ratio of the capacities of one of the units to the combined capacities of the two units; and so long as the voltage excursion of cathode 57 is rigidly maintained, the step size, or increment of potential change across capacitor 64 will be a constant value. The potential across capacitor 64 is reproduced, at a slightly more positive value, across cathode resistor 76, and on connecting circuit 77. Thus, when the voltage of capacitor 64 changes, the sweep voltage potential on conductor 77, which is connected to terminal 78 and to the upper terminal of potentiometer 164 (Fig. 3), is also changed.

At the termination of the negative voltage impulse on terminal 28, the potential of the cathode 57 of tube 50 returns to its minimum value, and capacitor 62 discharges over a path comprising resistors 58, 76, conductor 77, resistors 81, 82, the right half of tube 66, comprising anode 84 and cathode 69, and conductor 63. Because the potential of capacitor 64 is repeated, at a slightly more positive value at the cathode 71 of tube 74, capacitor 62 discharges in such manner that its right terminal acquires substantially the same potential as exists across capacitor 64. The left terminal of capacitor 62 returns to the minimum value potential of cathode 57 of tube 50. Therefore, when cathode 57 again assumes its maximum potential value, the change of potential across capacitor 62 will be substantially the same as it was at the time of the previous impulse, and substantially the same increment of potential charge will be added to capacitor 64. Thus, the increments of change in the potential across capacitor 64 are substantially equal as the potential across this capacitor is varied between the minimum and maximum potentials. Because of conventional cathode-follower action, the potential of cathode 71 is somewhat in excess of the potential on control electrode 70 and that across sweep capacitor 64. If it were not for the biasing effect of the capacitor 80-resistor 82 combination, this increased potential would cause charging current to flow through the right and left paths of tube 66 to further increase the charge of sweep capacitor 64. This action would be regenerative, and sweep capacitor 64 would gradually acquire an unwanted charge. This effect is prevented by the blocking bias that is developed across capacitor 80 when capacitor 62 is discharged through resistor 82. The charging current which flows through the right path of tube 66 creates a potential drop across this combination in such manner that the anode 84 of tube 66 is suitably negative with respect to the associated cathode. Thus, in the equilibrium state between voltage impulses on terminal 28, conduction through the double diode 66 is blocked, since the potential of anode 84 is suitably negative with respect to the potential of cathode 68, with which it is in series connection. Resistance 81 is not essential to the operation of the circuit, but in one tested embodiment it was found to be useful in reducing a small voltage impulse which might otherwise occur at cathode 71 of tube 74 during the recharging period of capacitor 62.

The sequence of operations which has been described is repeated at the time of each negative voltage impulse on terminal 28, until the voltage appearing at the cathode 71 reaches the predetermined maximum voltage value. Coincident with this condition, the relatively long positive potential reset impulse 31 is received at terminal 86 from pulse source 16 (Fig. 1), which pulse acts both to reset the stair-step wave generator 18 by rapidly discharging sweep capacitor 64, and to disable the pulse repeating portion of the circuit comprising tube 24. The pulse repeating portion of the circuit is disabled by the coupling of this positive voltage impulse 31 through capacitor 96 and resistor 39 to control electrode 37 of tube 24. This action increases the potential of control electrode 37 to the point of anode current saturation, and reduces the potential of control electrode 48 and that of cathode 57 of tube 50 to their minimum values, in the previously described manner. Thus, although stepping impulses 30 may be received on control electrode 26 during the interval of pulse 31, the potential of control electrode 48 is lowered to a value where these pulses are ineffective in controlling the potential of cathode 57. The discharge of sweep capacitor 64 is effective through tube 94 and the right half of tube 74. When the positive pulse appears at terminal 86, the normally non-conducting left section of tube 94 is made conductive, thereby cutting off the normally conducting right half which includes anode 95. The potential rise at anode 95 is sufficient to raise the potential of control electrode 73 of tube 74 positive to a point at which this electrode draws current, thereby reducing the plate resistance of the right half of tube 74 to its minimum value, and holds this tube at this minimum value until after sweep condenser 64, which is connected over conductor 59 to anode 72 of tube 74, has been discharged to substantially the potential of cathode 75. It will thus be seen that the action of tube 94 is to cause the amount of grid current which flows in control electrode 73 of tube 74 to be accurately controlled in order that this current may be taken into account in the design of the dividing network 60, 79.

At the termination of the positive voltage impulse 31, the right half of tube 24 is restored to non-conduction. The left half of this tube is restored to its conducting state, and this portion of the circuit is reconditioned for the reception of the negative voltage impulse 30 from terminal 28. In addition, anode current saturation is restored in the right half of the tube 94; and the right half of tube 74, including anode 72 and cathode 75, is returned to non-conduction, thus readying the circuit for another incremental potential change or build-up across the sweep capacitor 64.

As the potential on capacitor 64, and at cathode 71 of tube 74, changes, or steps from one value to another, the potential of control electrode 156 of tube 154 in relaxation oscillator 14 (Fig. 3) is progressively increased. These potential changes are reproduced across the grid return resistors 131, 132 and potentiometer 133, thereby controlling the oscillation frequency of oscillator 14. In the conventional manner of relaxation, or multivibrator oscillators, only one of tubes 106, 108 is conductive at any given instant. The voltage at the mid-point of potentiometer 133 is positive to a degree that both of the tubes 106, 108 may possibly be conductive at the start of operations. To overcome this, key 162 is provided, the transfer contact of which is connected to the common point of a capacitor-resistor combination 163, 163' through which negative voltage is supplied. When key 162 is operated, the accumulated negative potential on the capacitor 163' is placed almost directly on control electrode 156 of tube 154, thereby reducing the potential at the mid-point of potentiometer 133. As the potential of electrode 156 gradually recovers from this negative excursion, the change of potential at the mid-point of potentiometer 133 is such as to start tubes 106 and 108 oscillating in the desired manner. If it is assumed that tube 106 first regains conduction, the voltage drop across its anode load resistor 125 is coupled directly through the tube 135 and coupling capacitor 141 to control electrode 130 of tube 108. This change of potential across capacitor 141 drives control electrode 130 negative in the usual manner. Capacitor 141 now charges through resistor 132 toward the potential that exists at the mid-point of potentiometer 133, which potential is a function of the potential of the control electrode of tube 156. When capacitor 141 acquires sufficient charge to raise control electrode 130 to a point where current flows in tube 108, the potentials of anode 120 of tube 108 and of control electrode 136 and cathode 146 of tube 137 are changed in the negative direction, which change is coupled through capacitor 143 to the control electrode 128 of tube 106, to render this latter tube cut-off or non-conducting. The voltage rise at anode 118 of tube 106 is reflected in the control grid-cathode circuit of tube 135, and is coupled through coupling capacitor 141 to the control electrode 130 of tube 108.

Capictor 141 now charges from the source of anode supply through the principal charging path comprising the space discharge path of tube 135, capacitor 141, varistor 124 and the ground return to the negative terminal of the supply source. A second, and inconsequential, charging path is momentarily provided over the path comprising the space discharge path of voltage regulator 110, resistor 125, the control electrode-cathode path of tube 135, capacitor 141, varistor 124 and the ground return to the supply source. The current flow in this second path is additive to the current flow in the primary path, and forms only a relatively small part of the total charging current. It should be noted that neither anode load resistor 125 nor 126 is included in the principal charging path for capacitor 141. The same is true of the charging path for capacitor 143. Both of these capacitors are, therefore, charged, either positively or negatively, primarily through the relatively low impedance space discharge path of tube 135, 137 or 154.

In the type of multivibrator oscillator wherein the conventional capacitive coupling is used between the coupled anode and grid electrodes, it is well recognized that the value of the grid-return resistor must be greater than that of the anode resistor in a fairly well defined ratio. These values, together with the value of the coupling capacitor, are largely determinative of the maximum oscillation frequency, and, hence, the degrees of stability and linearity that may be expected in the oscillator at a specified operating frequency, or frequencies. Since, in the oscillator of this invention the anode resistor is removed from the frequency determinative branch of the circuit, it follows that it may have its optimum value without regard to the grid resistor. Similarly, since a low impedance space discharge path is substituted for the anode resistor in the capacitor charging circuits, much higher oscillating frequencies may be realized with greatly increased stability of operation and linearity of frequency change.

Since the coupling capacitors 141, 143 are charged from a low impedance source and acquire their charge in a shorter time than is the case in the conventional type of multivibrator oscillator, the potential of the control electrode 128 or 130 is raised more positively than is usual. This increased grid potential results in greatly increased screen current flow, and if no precautionary measure were taken it would adversely affect the linearity of the change of frequency as the potential at the mid-point of potentiometer 133 is changed, and would also be detrimental to the tube. To obviate this condition, the unidirectional conducting devices 122, 124, which may suitably be germanium varistors of the well-known type, are connected between the control electrode and the cathode of the respective tube. Therefore, when the highly positive impulse is coupled through coupling capacitor 141, or 143, this impulse is shunted to ground at the cathode rather than being permitted to increase the potential of the respective control electrode with the attendant undesirable results.

Output impulses from oscillator 14 are derived across resistor 148 in the cathode circuit of tube 137, and are coupled through capacitor 150 and conductor 151 to a suitable utilization circuit which, as was previously stated, may be a balanced modulator 12 (Fig. 1). A second output is taken from the oscillator through the connection of coupling capacitor 140 to cathode 138 of tube 135. This output is connected over conductor 142 to the frequency-stabilizing circuit of Fig. 4.

Proceeding now to the operation of the frequency-stabilizing circuit of Fig. 4, the oscillations on conductor 142 cause substantially sine wave frequency variations at the anode 177 of tube 144. The magnitude of these variations is dependent upon how much the oscillating frequency of oscillator 14 varies from the resonant frequency of the inductor-capacitor combination 179, 180, the values of which are so chosen that they resonate at a slightly lower frequency than the minimum operating frequency of oscillator 14. Therefore, as the frequency of oscillator 14 varies from its minimum value, the amplitude of the alternating component appearing at anode 177 of tube 144 also changes. This change is opposite to the frequency change, that its, with frequency increase the amplitude of the alternating component decreases. As was previously stated, the control grid bias derived from potentiometer 184 is chosen such that cathode 187 resides at a predetermined suitable voltage, for example, ten to twenty volts, positive with respect to ground, when its control electrode is excited by oscillations that are derived when oscillator 14 is operated at its desired minimum frequency. As the frequency of oscillator 14 deviates from its optimum values, the magnitude of the alternating components that appear on control electrode 183 of tube 172 also deviates, and the potential at the cathode ends of resistors 188 and 192 rises above or falls below the optimum value in reverse relation with variations in the frequency of oscillator 14. During intervals when relay 194 is operated, the potential across cathode resistor 192 is applied through resistor 199 to storage capacitor 196 in the control grid circuit of tube 174, and is isolated on this capacitor when relay 194 is released. The potential across storage capacitor 196 is repeated across cathode load resistor 175, and is connected over contact 1 of key 181 and conductor 170 to the lower terminal of resistor 168 in the voltage combining resistance network in the control grid circuit of tube 154 of oscillator 14. The changes in this fed back voltage are such as tend to return oscillator 14 to its desired minimum frequency.

Since the frequency of oscillator 14 is being successively stepped between predetermined minimum and maximum values by the potential changes at potentiometer 164, caused by the stair-step output wave from generator 18 (Fig. 2), it is apparent that the frequency indicating voltage across cathode resistor 192 (Fig. 4) is constantly varying. If this changing voltage were applied to storage capacitor 196, the frequency of oscillation of oscillator 14 would be accordingly varied by this feedback action. This condition is avoided by interconnecting cathode resistor 192 and storage capacitor 196 only during the relatively short interval when capacitor 64 (Fig. 2) has its minimum potential value, and oscillator 14 (Fig. 3) has its minimum operating value. To this end, the normally open contacts of relay 194 are in series with the connection between resistor 192 and capacitor 196.

It was previously stated that the positive voltage pulse 31 on terminal 86 effectuated the discharge of storage capacitor 64 and incapacitated, during its period, the pulse repeating function of tube 24 in generator 18. In addition to these functions, the impulse 31 indirectly controls the operation of relay 194. Conduction is started in the left half of the single-trip multivibrator comprising the double triode 176 concurrently with pulse 31. This condition will prevail for a period that is determined by the time constant of resistor 204 and capacitor 218, after which conduction will return to the right half of the multivibrator, and a positive voltage impulse will appear at the anode 216 of tube 176. The duration of the cut-off period of the right side of this multivibrator is chosen such that oscillator 14 may be returned from its maximum to its minimum frequency value, and all transients may have subsided, before the storage capacitor 196 is connected to cathode load resistor 192. In one tested embodiment, this time was suitably about seven milliseconds when the duration of the positive pulse on terminal 86 was about twenty-two milliseconds. When the potential of anode 216 is increased at the end of its conduction interval, a positive voltage pulse is transmitted through coupling capacitor 220, which pulse forces conduction in the left half of the single-trip multivibrator comprising tube 178. Conduction in the left half of 178 cuts off the right half of this tube, and the resulting increased potential at anode 224 of tube 178 is sufficient to cause triode 228 to operate at anode current saturation; and, since the winding of relay 194 is included in its anode circuit, to operate this relay and thereby complete the circuit between cathode resistor 192 and storage capacitor 196. At the end of the cut-off period of the right half of triode 178, conduction in triode 228 is interrupted, and the contacts of relay 194 are opened. In this manner, then, at a suitable time, for example, seven milliseconds, after the appearance of the positive voltage impulse on terminal 86 the contacts of relay 194 are closed and the potential of storage capacitor 196 is regulated in accordance with the operating frequency of oscillator 14 in such manner that this oscillator tends to be returned to its optimum minimum value. This readjusted biasing voltage prevails throughout the following frequency sweep, after which the frequency-checking and bias adjusting process is repeated during the next minimum frequency operating interval.

Although this invention has been described as being incorporated in a specific apparatus, in which various of the circuits parameters have been specifically designated by way of illustrative example, it should be appreciated that the invention is not limited to the stated values nor to the specific structure described herein. Various modifications which do not depart from the spirit and scope of the invention will suggest themselves to those skilled in the art to which this invention pertains.

Certain of the subject-matter of this disclosure is the basis of a divisional application of the present inventor, Serial No. 243,958, filed August 28, 1951, for Variable-Frequency Relaxation Oscillator.

What is claimed is:

1. A relaxation oscillator comprising a plurality of vacuum tubes each of which has at least a cathode, an anode and a control electrode, anode-cathode and control electrode-cathode circuits therefor, a source of potential the positive terminal of which is resistively connected to the anodes of a first and second of said tubes and which is directly connected to the anodes of a third and fourth of said tubes, the negative terminal of said source being directly connected to the cathodes of said first and second tubes and being resistively connected to the cathodes of said third and fourth tubes, conductive connections between the control electrode and cathode of said first and second tubes, conductive connections between the anode and control electrodes of said first and third tubes and said second and fourth tubes, respectively, and capacitive couplings between the control electrode and cathode of said second and third tubes and said first and fourth tubes, respectively.

2. A relaxation oscillator comprising a pair of oscillator tubes and a pair of amplifier tubes, each of said tubes including at least an anode, a cathode, and a control electrode, a source of potential having a positive terminal resistively connected to the anodes of said oscillator tubes and directly connected to the anodes of said amplifier tubes and having a negative terminal directly connected to the cathodes of said oscillator tubes and resistively connected to the cathodes of said amplifier tubes, a source of positive potential and resistive connections between said source and the control electrodes of said oscillator tubes, means interconnecting the anode of each oscillator tube with the control electrode of a respective amplifier tube, and means interconnecting the cathode of each amplifier tube and the control electrode of a respective oscillator tube.

3. The oscillator of claim 2 in which the interconnection between the anode of each oscillator tube and the control electrode of the respective amplifier tube is a direct conductive connection.

4. The oscillator of claim 2 in which each means interconnecting the cathode of each amplifier tube and the control electrode of a respective oscillator tube is a capacitive coupling circuit.

5. The oscillator of claim 2 in which said source of positive potential is a cathode-coupled amplifier, the cathode circuit of which includes the resistive connections to the control electrodes of said oscillator tubes.

6. A relaxation oscillator comprising a pair of oscillator tubes and a pair of amplifier tubes, each of said tubes including at least an anode, a cathode and a control electrode, a source of potential having a positive terminal conductively connected to the anode of each tube, the connections to said oscillator tubes including individual resistors, and having a negative terminal conductively connected to the cathode of each tube, the cathode connections to said amplifier tubes including individual resistors, the control electrode of each oscillator tube being resistively coupled to a source of variable positive potential, a unidirectional conducting device connected between the control electrode and cathode of each oscillator tube, a conductive coupling between the anode of each oscillator tube and the control electrode of a conjugate respective amplifier tube, and a capacitive connection between the cathode of said conjugate amplifier tube and the control electrode of the other of said oscillator tubes.

7. The oscillator of claim 6 in which each of said unidirectional conducting devices is poled such that it readily conducts electrons from said cathode to said control electrode.

8. The oscillator of claim 6 in which each of said unidirectional conducting devices is a germanium varistor.

9. The oscillator of claim 6 in which said source of variable positive potential comprises a cathode-coupled amplifier, the cathode circuit of which includes the resistive connections to the control electrodes of said oscillator tubes.

MILTON E. MOHR.

REFERENCES CITED

The following references are of record in the file of this patent:

UNITED STATES PATENTS

| Number | Name | Date |
|---|---|---|
| 2,217,401 | Geiger | Oct. 8, 1940 |
| 2,441,579 | Kenyon | May 18, 1948 |
| 2,443,922 | Moore | June 22, 1948 |
| 2,474,040 | Day | June 21, 1949 |
| 2,474,278 | Ranger | June 28, 1949 |
| 2,486,265 | Dennis | Oct. 25, 1949 |
| 2,487,191 | Smith, Jr. | Nov. 8, 1949 |
| 2,501,620 | Skellett | Mar. 21, 1950 |